(12) United States Patent
Huebner et al.

(10) Patent No.: US 11,483,486 B1
(45) Date of Patent: Oct. 25, 2022

(54) VIRTUAL EXPERIENCE IMAGING PRODUCTS

(71) Applicant: Disney Enterprises, Inc., Burbank, CA (US)

(72) Inventors: Robert E. Huebner, Burbank, CA (US); Asa K. Kalama, Burbank, CA (US); Peter Stepniewicz, Altadena, CA (US); Robert S. Trowbridge, Burbank, CA (US); Joshua B. Gorin, Burbank, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 0 days.

(21) Appl. No.: 16/421,174

(22) Filed: May 23, 2019

(51) Int. Cl.
| | |
|---|---|
| *H04N 5/235* | (2006.01) |
| *A63G 31/16* | (2006.01) |
| *G06T 7/00* | (2017.01) |
| *H04N 5/265* | (2006.01) |
| *A63G 31/02* | (2006.01) |

(52) U.S. Cl.
CPC .......... *H04N 5/2351* (2013.01); *A63G 31/16* (2013.01); *G06T 7/0002* (2013.01); *H04N 5/2354* (2013.01); *H04N 5/265* (2013.01); *A63G 31/02* (2013.01); *G06T 2207/30168* (2013.01); *G06T 2207/30196* (2013.01); *G06T 2207/30268* (2013.01)

(58) Field of Classification Search
CPC ... G06T 19/006; G06F 3/011; B60R 2300/60; H05B 47/155; G02B 2027/0138; B60K 2370/176; B60K 2370/177
See application file for complete search history.

(56) References Cited

U.S. PATENT DOCUMENTS

| | | | | |
|---|---|---|---|---|
| 2017/0068323 | A1* | 3/2017 | West | G06F 3/0485 |
| 2018/0255285 | A1* | 9/2018 | Hall | G06F 3/04845 |
| 2018/0284881 | A1* | 10/2018 | Briggs | A63G 21/18 |
| 2019/0205617 | A1* | 7/2019 | Bertan | G06K 9/00288 |

* cited by examiner

*Primary Examiner* — Christopher Braniff
(74) *Attorney, Agent, or Firm* — Kilpatrick Townsend & Stockton LLP

(57) ABSTRACT

Systems and methods for virtual experience video generation are disclosed herein. The system can include a passenger vehicle including a plurality of passenger locations, a content presentation system for presenting images from a virtual world to passengers in the passenger vehicle, at least one camera for capturing video of the passenger locations, and a processor. The processor can: capture video data of a passenger of a passenger vehicle during a ride experience, identify portions of captured video data for inclusion in the virtual experience video, select video data generated from a virtual world, and combine captured video data and generated video data.

20 Claims, 7 Drawing Sheets

VIRTUAL EXPERIENCE IMAGING PRODUCTS

BACKGROUND OF THE INVENTION

The present disclosure relates generally to automatic creation of content capturing a passenger during a ride experience. Amusement rides have frequently included cameras located throughout the ride to capture passenger reactions to portions of the amusement ride. Most commonly, rollercoasters frequently have cameras positioned either immediately before or along a large drop. These cameras are able to capture images of passengers delight or fear as they begin or continue down the drop.

These cameras are frequently positioned in well-lit locations and/or are positioned in connection with artificial lighting. While these solutions are adequate for rides such as rollercoasters, they are unable to capture quality image data in many modern rides. Due to these drawbacks, further developments in amusement rides are desired.

BRIEF SUMMARY OF THE INVENTION

One aspect of the present disclosure relates to a method of automated image capture. The method includes: generating imagery of a virtual world to a passenger vehicle during a ride experience; determining a location of at least one passenger in the passenger vehicle during the ride experience; identifying a coming first event in the virtual world during the ride experience, which coming first event illuminates the location of the at least one passenger in the passenger vehicle; and capturing first image data during occurrence of the first event.

In some embodiments, the first event can be a bright lighting event such as a simulated lightning strike or simulated explosion. In some embodiments, the method includes: determining an inadequacy of the illuminating of the location of the at least one passenger in the passenger vehicle of the coming first event, and generating supplemental illumination during occurrence of the first event to compensate for the inadequacy of the illuminating of the location of the at least one passenger during occurrence of the first event. In some embodiments, the supplemental illumination can be a flash.

In some embodiments, the method includes: determining acceptability of the first image data; and updating a value associated with the passenger based on the acceptability of the first image data. In some embodiments, determining acceptability of the first image data includes determining visibility of the face of the at least one passenger.

In some embodiments, the method includes: identifying a coming second event in the virtual world, which coming second event illuminates the location of the at least one passenger in the passenger vehicle; and capturing second image data during occurrence of the second event. In some embodiments, the second event is identified when the first image data is unacceptable, and wherein the second image data is captured when the first image data is unacceptable.

In some embodiments, the method includes: determining a location of a second passenger in the passenger vehicle; identifying a coming second event in the virtual world during the ride experience, which coming second event illuminates the location of the second passenger in the passenger vehicle; and capturing second image data of the second passenger during occurrence of the second event. In some embodiments, the illumination of the location of the second passenger during the first event inadequately illuminates the location of the second passenger in the passenger vehicle.

One aspect of the present disclosure relates to a system for automated image capture. The system includes: a passenger vehicle having a plurality of passenger locations; a content presentation system that can present images from a virtual world viewable in the passenger vehicle; at least one camera; and a processor. In some embodiments, the processor can: control generation of imagery of a virtual world viewable from the passenger vehicle during a ride experience; determine a location of at least one passenger in the passenger vehicle during the ride experience; identify a coming first event in the virtual world during the ride experience, which coming first event illuminates the location of the at least one passenger in the passenger vehicle; and capture first image data during occurrence of the first event.

In some embodiments, the first event can be a bright lighting event such as a simulated lightning strike or simulated explosion. In some embodiments, the processor can: determine an inadequacy of the illuminating of the location of the at least one passenger in the passenger vehicle of the coming first event; and generate supplemental illumination during occurrence of the first event to compensate for the inadequacy of the illuminating of the location of the at least one passenger during occurrence of the first event. In some embodiments, the supplemental illumination can be a flash.

In some embodiments, the at least one processor can: determine acceptability of the first image data; and update a value associated with the passenger based on the acceptability of the first image data. In some embodiments, determining acceptability of the first image data includes determining visibility of the face of the at least one passenger. In some embodiments, the processor can: identify a coming second event in the virtual world, wherein the coming second event illuminates the location of the at least one passenger in the passenger vehicle; and capture second image data during occurrence of the second event. In some embodiments, the second event is identified when the first image data is unacceptable, and the second image data is captured when the first image data is unacceptable.

In some embodiments, the processor can: determine a location of a second passenger in the passenger vehicle; identify a coming second event in the virtual world during the ride experience, which coming second event illuminates the location of the second passenger in the passenger vehicle; and capture second image data of the second passenger during occurrence of the second event. In some embodiments, the illumination of the location of the second passenger during the first event inadequately illuminates the location of the second passenger in the passenger vehicle.

One aspect of the present disclosure relates to a method of virtual experience video generation. The method includes: capturing video data of a passenger of a passenger vehicle during a ride experience; identifying portions of captured video data for inclusion in the virtual experience video; selecting video data generated from a virtual world, which video data generated from the virtual world is relevant to the ride experience; and combining captured video data and generated video data.

In some embodiments, the ride experience includes digital content portraying the virtual world, which digital content is viewable from the passenger vehicle. In some embodiments, the method includes receiving user inputs during the ride experience, which ride experience and the digital content changes based on the received user inputs. In some embodiments, the video data generated from the virtual world changes based on the received user inputs. In some embodiments, the video data generated from the virtual world is not presented as part of the ride experience.

In some embodiments, the video data generated from the virtual world depicts actions of a virtual passenger vehicle in the virtual world, which virtual passenger vehicle represents the passenger vehicle in the virtual world. In some embodiments, the virtual passenger vehicle can be at least one of: an aircraft; a land transport vehicle; an animal; a fantasy creature; a watercraft; or a spacecraft. In some embodiments, the video data generated from the virtual world is pre-generated. In some embodiments, selecting video generated from the virtual world includes matching segments of video data generated from the virtual world to received user inputs. In some embodiments, the video data generated from the virtual world is generated subsequent to receipt of user inputs, and the video data generated from the virtual world is custom generated based on the received user inputs.

One aspect of the present disclosure relates to a system for virtual experience video generation. The system includes: a passenger vehicle including a plurality of passenger locations; a content presentation system that can present images from a virtual world viewable in the passenger vehicle; at least one capture that can generate video of at least one of the plurality of passenger locations in the passenger vehicle; and a processor. In some embodiments, the processor can: capture video data of a passenger of a passenger vehicle during a ride experience; identify portions of captured video data for inclusion in the virtual experience video; select video data generated from a virtual world, which video data generated from the virtual world is relevant to the ride experience; and combine captured video data and generated video data.

In some embodiments, the ride experience includes digital content portraying the virtual world, which digital content is viewable from the passenger vehicle. In some embodiments, the processor can receive user inputs during the ride experience, which ride experience and the digital content changes based on the received user inputs. In some embodiments, the video data generated from the virtual world changes based on the received user inputs. In some embodiments, the video data generated from the virtual world is not presented as part of the ride experience.

In some embodiments, the video data generated from the virtual world depicts actions of a virtual passenger vehicle in the virtual world, which virtual passenger vehicle represents the passenger vehicle in the virtual world. In some embodiments, the virtual passenger vehicle can be at least one of: an aircraft; a land transport vehicle; an animal; a fantasy creature; a watercraft; or a spacecraft. In some embodiments, the video data generated from the virtual world is pre-generated. In some embodiments, selecting video generated from the virtual world includes matching segments of video data generated from the virtual world to received user inputs. In some embodiments, the video data generated from the virtual world is generated subsequent to receipt of user inputs, and the video data generated from the virtual world is custom generated based on the received user inputs.

DETAILED DESCRIPTION OF THE INVENTION

Figure 1:
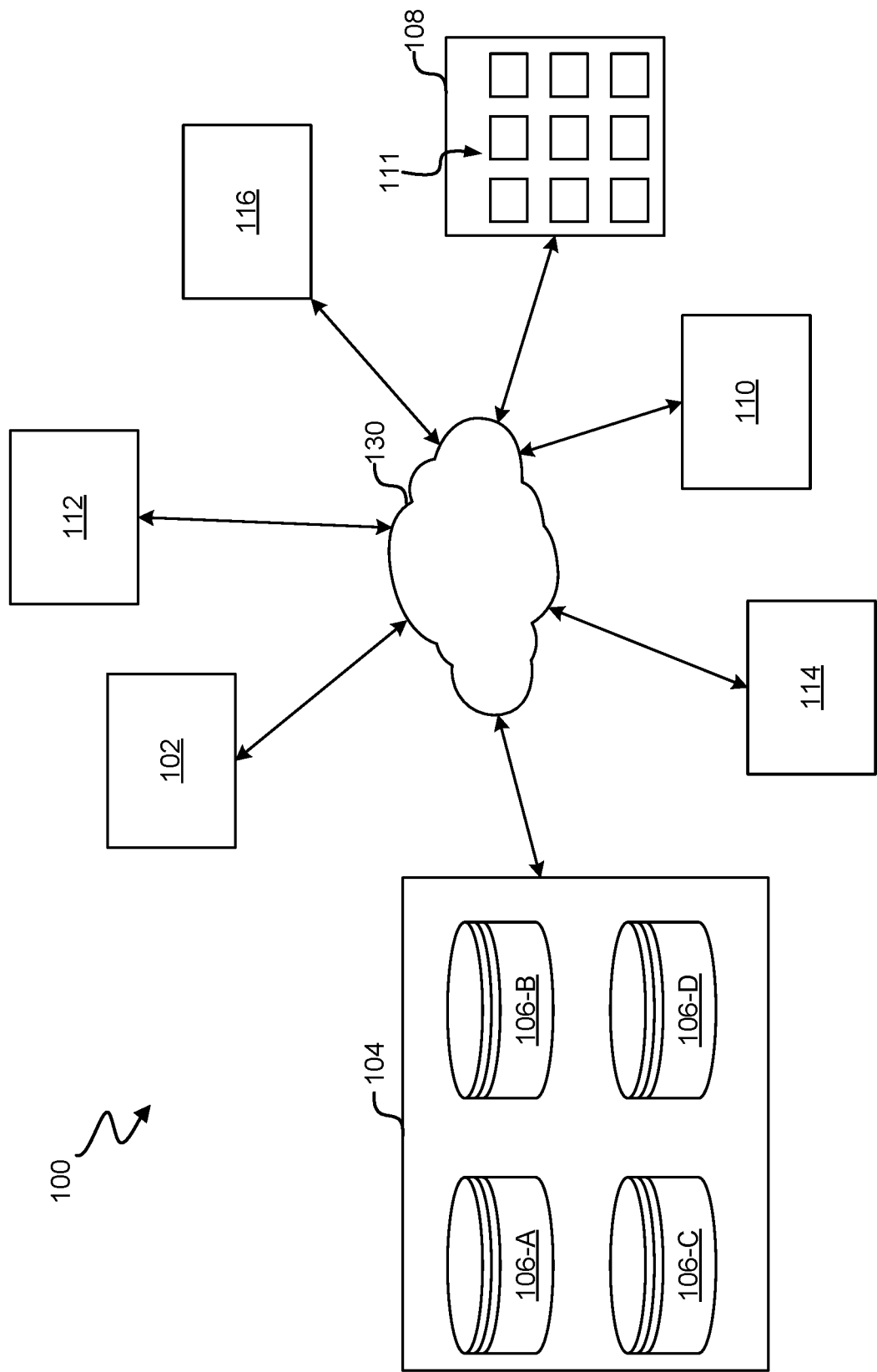
FIG. 1 is a schematic illustration of one embodiment of a system for dynamic unlock.

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

I. Introduction

Developing technologies in simulation present many opportunities for future creation of amusement rides that provide a unique and customized experience for ride passengers. While these technologies provide opportunities for future amusement rides, they also present challenges for the generation of content based on passenger responses to the ride. For example, the use of artificial lighting such as flashes may degrade a passengers ride experience. Further, the passenger vehicle may be inadequately lit during a ride experience to allow image capture without the use of artificial lighting. Further, because much of the ride experience is within a virtual world, video of the passenger vehicle may not capture the full passenger experience.

These and other problems can be overcome through the use of systems and methods as disclosed herein. For example, generation of image and/or video data can be timed to correspond with predetermined events and/or with one or several predetermined event types occurring during the ride experience. These events or event types can be "bright" events that brightly illuminate all or portions of the passenger vehicle. The light from these bright events can be supplemented with artificial lighting such as flood or flash lighting, with the lighting being timed to last for all or portions of the bright event.

Further, a video representative of a passenger's ride experience can be generated by combining video of the passenger and/or of the passenger area of the passenger vehicle captured during the ride experience with video data generated showing the virtual world and events occurring in the virtual world. For example, a passenger may ride in a passenger vehicle representing an automobile which drives through a virtual world, portions of which virtual world are presented during the ride experience as viewable from the passenger vehicle. Video may be captured of the passenger in the passenger vehicle and video data may be generated from the virtual world. This video data may show events and/or perspectives that were not visible from the passenger vehicle such as, for example, a third-person perspective of a virtual representation of the passenger vehicle. For example, the video data may show the automobile (a virtual passenger vehicle representing the passenger vehicle) containing the passenger driving down a road and navigating around turns. This video generated from the virtual world can be combined with video captured of the passenger and/or of the passenger area of the passenger vehicle.

The video generated from the virtual world can be customized based on one or several inputs received from the user during the ride experience. Referring again to the example of the automobile, in the event that the passenger failed to properly navigate a turn and drove off the road or collided with a street barrier, the generated video of the virtual world could show the automobile colliding with the street barrier or driving off of the road. This customization can occur via the selection of one or several pre-generated video segments that coincide with the user inputs and/or via the generation of the video based on the virtual window subsequent to the receipt of the user inputs.

II. Virtual Experience Imaging System

With reference now to FIG. 1 a schematic illustration of one embodiment of a virtual experience imaging system 100 is shown. The system 100 can include a processor 102. The processor 102 can be any computing and/or processing device including, for example, one or several laptops, personal computers, tablets, smartphones, servers, mainframe computers, processors, or the like. The processor 102 can be configured to receive inputs from one or several other components of the system 100, to process the inputs according to one or several stored instructions, and to provide outputs to control the operation of one or several of the other components of the system 100.

In some embodiments, the processor 102 can include a game engine that can include a rendering engine. The game engine and the rendering engine can together, or independently develop and/or progress the narrative of the simulation and/or the generate images corresponding to that narrative. In some embodiments, the narrative can take place in a virtual world. As used herein, the "virtual world" is a computer-based simulation environment generated by the game engine and/or rendering engine and from which the images, events, video, storylines, sounds, effects, or the like of the narrative are generated. In some embodiments, the rendering engine can generate one or several events that can be, in part, based upon user inputs provided to the system 100. These events can include, for example, one or several accelerations, decelerations, changes in direction, interaction with one or several objects or characters, or the like.

In some embodiments, the processor 102 can include a motion control. The motion control can control motion of a simulation vehicle 108—also referred to herein as a passenger vehicle 108, passenger conveyance 108, or attraction environment 108—via control of a motion base 110 that is connected to the simulation vehicle 108 and/or upon which or on which the simulation vehicle is mounted. The motion control can control motion of the simulation vehicle according to one or several inputs received from the user and/or one or several game events.

The processor 102 can include image capture control which can control one or several features of the system 100 to capture images and/or video used in creation of the virtual experience imaging. These features of the system can include one or several cameras 112 and/or illumination features 114.

The system 100 can include memory 104. The memory 104 can represent one or more storage media and/or memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. The memory 104 can be an integral part of the processor 102 and/or can be separate from the processor 102. In embodiments in which the memory 104 is separate from the processor 102, the memory 104 and the processor 102 can be communicatingly linked via, for example, communications network 130. In some embodiments, the communications network 130 can comprise any wired or wireless communication connection between the components of the simulation system 100.

The memory 104 can include software code and/or instructions for directing the operation of the processor 102 and/or can include one or several databases 106 containing information used by the processor 102 and/or generated by the processor 102.

The memory 104 can include a narrative/imagery database 106-A. The narrative/imagery database 106-A stores narrative and image data. This narrative and/or image data can define and/or bound the virtual world. This narrative and image data can include information and/or data relating to the narrative and the imagery generated as part of the narrative. Specifically, the narrative and image data is data and information that is used to generate the narrative and the imagery and/or sound in the narrative. This can include identification of one or several: objects; characters; effects; or things existing within the narrative, and data or databases defining these one or several: objects; characters; effects; or things. This data or databases defining the one or several: objects; characters; effects; or things can identify attributes of the one or several objects, characters, effects, or things, which attributes can define a size, a speed, sound, movement characteristics, illumination characteristics, or the like. The narrative database 106-A can further include information regarding events in the narrative and the sequencing of those events.

The memory 104 can include a vehicle database 106-B. The vehicle and/or actuator system database 106-B can include data relating to the simulation vehicle and/or the actuator system. In some embodiments, this database 106-B can include information relating to features of the simulation vehicle and/or relating to the control of the simulation vehicle and/or the interaction with user control features located on the simulation vehicle. In some embodiments, for example, the simulation vehicle can move in response to user inputs to the user control features and/or according to the narrative of the simulation or to events in the narrative of the simulation. The vehicle database 106-B can include data identifying one or several features of the simulation vehicle that enable the movement of the simulation vehicle. These features can include, for example, one or several motors, servo motors, pneumatic, electric, or hydraulic components, any motion causing component, or the like.

The memory 104 can include an image database 106-C. The image database 106-C can include image data, including still image data and/or video image data captured by the system 100. The image data can be captured by the camera 112 under control of the processor 102. The image data can capture one or several still images and/or video of the simulation vehicle 108 and/or of one or several passenger locations 111 in the simulation vehicle 108. In some embodiments, the image data in the image database 106-C can be organized by passenger, by passenger location, or by passenger vehicle. In some embodiments, the image data in the image database 106-C can be organized to allow retrieval of image data relevant to one or several passengers, one or several passenger locations, and/or one or several passenger vehicles.

The memory 104 can include a virtual world image database 106-D. The virtual world image database 106-D can include 3D models, and/or image data, including still image data and/or video image data, generated by the system 100 and relating to the virtual world. In contrast to the narrative/imagery database 106-A, the virtual world image database 106-D contains image data that is not part of the ride experience and/or that is not viewable from the passenger vehicle 108. In some embodiments, this can include image data from a perspective other than the perspective of the simulation vehicle 108 such as, for example, a third person perspective.

In some embodiments, this image data can be generated by the system 100 before a ride experience is provided to one or several passengers of the simulation vehicle 108, and in some embodiments, some or all of this image data can be generated by the system 100 subsequent to the providing of the ride experience and/or based on portions of the ride experience. In some embodiments, image data stored in the virtual world image database 106-D can be linked and/or associated with one or several events and/or user inputs. In some embodiments, for example, the virtual world image database 106-D can include a plurality of segments of image data, each of which segments can be associated with one or several events within the virtual world and/or with one or several user inputs effecting the virtual world and/or one or several events in the virtual world.

The system 100 can include one or several simulation vehicles 108. The simulation vehicle 108 can provide hardware corresponding to some or all of the features of the virtual conveyance in which the passenger is located in the gaming/simulation portion of the ride experience. The simulation vehicle 108 can transport passengers from a starting position to a termination positon, which starting position can be the location at which passengers enter the simulation vehicle 108 and which termination position can be the location at which the passengers exit the simulation vehicle 108. In some embodiments, the starting position and the termination position can be co-located.

The simulation vehicle 108 can contain one or several passengers in, for one or several passenger locations 111. Each of these passenger locations 111 can include, for example, a seat, a restraint system, or the like. The simulation vehicle 108 and/or the components thereof can be communicatingly connected with the processor 102. This communication connection can allow the providing of information to the simulation vehicle 108, which information can control operation of all or portions of the simulation vehicle 108, and which communicating connection can allow the receipt of information from the simulation vehicle 108 by the server 102, which information can include one or several user inputs at the simulation vehicle 108. The simulation vehicle 108 can be movable according to the narrative and/or according to one or several events in the narrative to, in combination with generated imagery, create the sensation of movement for the passengers. In some embodiments, each of the simulation vehicles 108 can be mounted to, on, and/or upon a motion base 110, also referred to herein as the actuator system. The motion base 110 can move the simulation vehicle 108 that is mounted to, on, and/or upon the motion base 110. The motion base 110 can include one or several: motors; servo motors; pneumatic components; hydraulic components; electric components; any motion causing component; or the like.

The simulation vehicle 108 can include controls 109 through which one or several user inputs can be received. In some embodiments, these controls can include one or several: wheels; levers; buttons; control sticks; pedals; switches; slides; and knobs. In some embodiments, the simulation vehicle 108 can move and/or be configured to move according to control signals received from the processor 102 and/or the user control features.

The system 100 can include an image data capture system 112. In some embodiments the image data capture system 112 can comprise one or several cameras. The one or several cameras can be positioned to generate image data of the passenger vehicle 108 and/or of one or several passenger locations 111 within the passenger vehicle 108. The one or several cameras can be coupled to the passenger vehicle 108, coupled to the motion base 110, and/or uncoupled to both the passenger vehicle 108 and the motion based 110. In some embodiments, for example, each passenger vehicle 108 can be coupled to one or several cameras. The one or several cameras can generate one or several still images and/or video. The image data capture system 112 can be communicatingly coupled to the processor 102 and can be controlled by the processor 102 to generate image data at one or several desired times during the ride experience.

In some embodiments, the image capture system 112 can further capture audio from the passenger vehicle 108. In such embodiments, the image capture system 112 can include one or several microphones configured and/or positioned to capture audio from the passenger vehicle.

The system 100 can include an illumination system 114. The illumination system can include one or several lights such as, for example, one or several flood lights, and/or one or several flashes, one or several light generating objects and/or features in the simulation vehicle 108 such as one or several buttons, screens, and/or indicators. The illumination system 114 can provide illumination for stage effects and/or to facilitate in generation of image data by the image data capture system 112. In some embodiments, these stage effects can provide, for example, illumination for simulated lighting events. In some embodiments, the illumination system 114 can be communicatingly coupled to the processor 102 and can be controlled by the processor 102 to generate illumination at one or several desired times during the ride experience.

The system 100 can include an image generator 116, also referred to herein as a simulation display. The image generator 116 can be communicatingly connected with the processor 102 and can comprise one or several features configured to generate images according to one or several control signals received from the processor 102. The image generator 116 can comprise one or several screens, displays, monitors, projectors, illuminators, lasers, or the like. In some embodiments, the image generator 116 can further include one or several speakers or other features configured to generate sound. In some, the one or several screens, displays, monitors, projectors, illuminators, speakers, and/or lasers forming the image generator 116 can be connected to the simulation vehicle such that they move with the movements of the simulation vehicle 108, or the one or several screens, displays, monitors, projectors, illuminators, and/or lasers forming the image generator 116 can be separated from the simulation vehicle 108. In some embodiments, the one or several screens, displays, monitors, projectors, illuminators, and/or lasers forming the image generator 116 can be wholly or partially: flat; curved; domed; arched; and/or angled. The generated images can be viewable by the passenger from the simulation vehicle 108.

Figure 2:
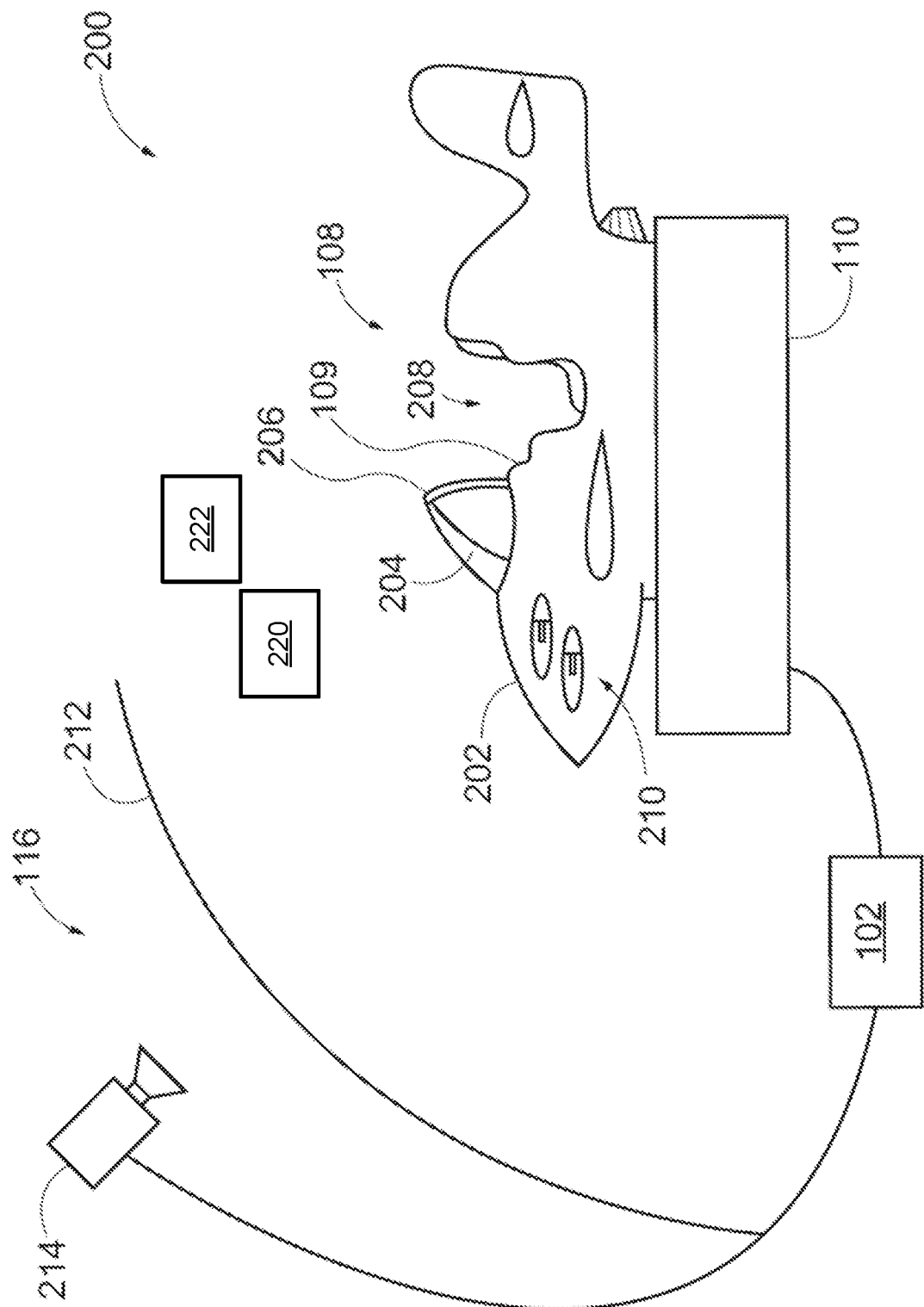
FIG. 2 is a schematic illustration of one embodiment of a system including simulation vehicles.

With reference to FIG. 2, a schematic illustration of a simulation environment 200 is shown. The simulation environment 200 can include all or portions of the system 100. Specifically, as seen in FIG. 2, the simulation environment 200 includes the simulation vehicle 108, the motion base 110, and the user controls 109. The simulation vehicle 108 shown in FIG. 2, further includes a body 202 including windows 204 and opaque structural features 206 such as, for example, a roof, pillars, posts, and/or window frames or framing. The simulation vehicle 108 can further include a passenger area 208 that can include the passenger locations 111 including, for example, one or several seats, restraints, or the like. The simulation vehicle 108 can include one or several accessory features 210 which can be, for example, items that can interact with the surrounding environment, including, for example, lights, projectiles, vehicles, and/or characters.

The simulation environment 200 can include the image generator 116. The image generator 116 can include a screen 212 and at least one projector 214. The screen 212 can comprise a variety of shapes and sizes and can be made from a variety of materials. In some embodiments, the screen 212 can be flat, and in some embodiments, the screen 212 can be angled, curved, domed, or the like. In some embodiments, the screen 212 is curved and/or domed to extend around all or portions of the simulation vehicle 108, and specifically is curved and/or domed to extend around portions of the simulation vehicle 108 so that a passenger looking out of the simulation vehicle 108 sees the screen.

One or several projectors 214 can project images onto the screen 212. These projectors 214 can be located on the same side of the screen 212 as the simulation vehicle 108 or on the opposite side of the screen 212 as the simulation vehicle. The projectors 214 can be controlled by the processor 102.

The simulation environment 200 can include one or several cameras 220 and/or one or several supplemental illumination features 222. The one or several cameras can be part of the image data capture system 112 and can be configured to capture image data relating to a ride experience and particularly relating to the actions and/or reactions of one or several passengers of the passenger vehicle 108 during the ride experience. The one or several supplemental illumination features 222 can comprise one or several lights and/or light sources. The one or several supplemental illumination features 222 can be part of the illumination system 114 and can be controlled by the processor 102 to generate illumination at one or several desired times during the ride experience.

III. Virtual Experience Image Data Generation

Figure 3:
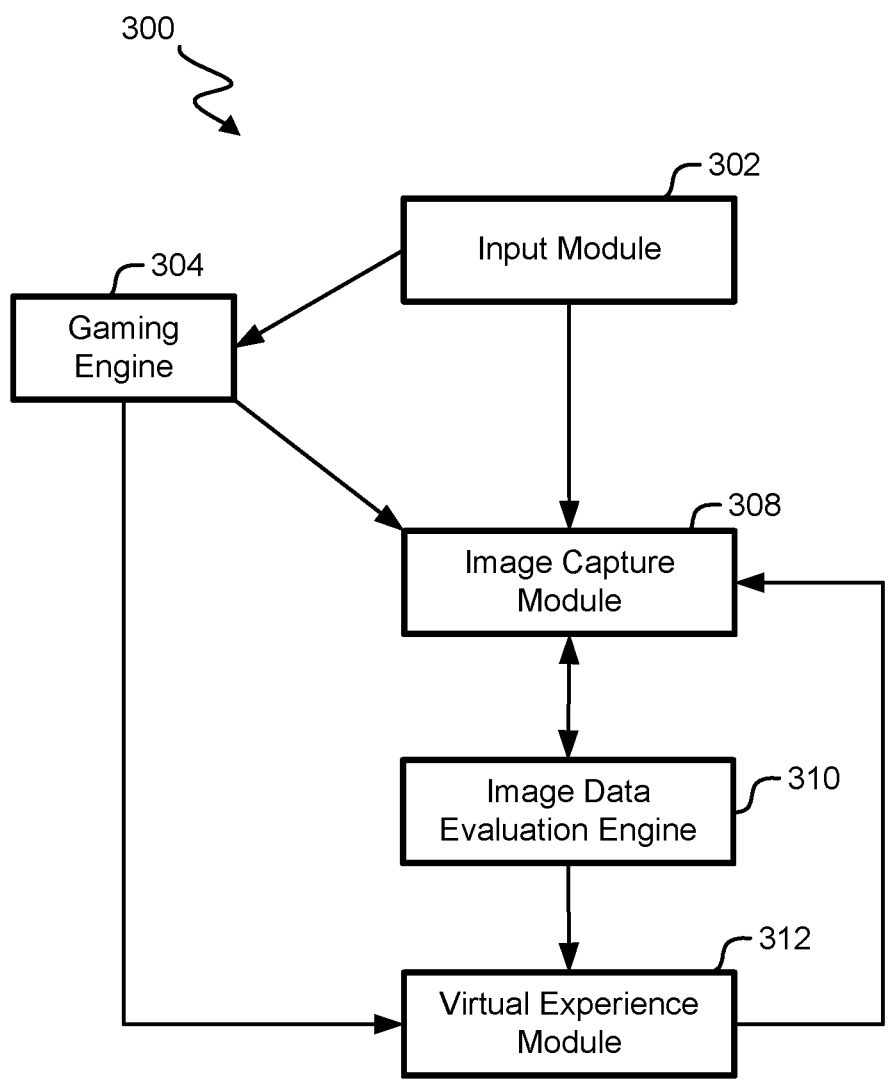
FIG. 3 is a functional block diagram of modules for virtual experience imaging data generation.

With reference to FIG. 3, a functional block diagram of modules 300 for virtual experience imaging data generation is shown. These modules 300 can be hardware modules and/or software modules. In some embodiments, these modules 300 can be wholly or partially located on or in the processor 102. These modules include an input module 302. The input module 302 can communicate with the controls 109 of the simulation vehicle 108 to receive electrical signals corresponding to user inputs provided via the controls 109. The input module 302 can output information relating to the user inputs to a gaming engine 304 and to an image capture module 308.

The gaming engine 304 can control the generation and/or presentation of the narrative of the ride experience to a passenger of the simulation vehicle 108. This generation and/or presentation of the narrative can be based on the virtual world in which the ride experience takes place and/or can include the generation of the virtual world in which the ride experience takes place. The generation and/or presentation of the narrative can include the identification of game events which can include an acceleration, a deceleration, a change in direction of travel, a collision with an object, an explosion, or the like. The generation and/or presentation of the narrative of the ride experience can include generation of signals to control the image generator 116 to generate imagery and/or sound corresponding to one or several events in the narrative of the ride experience. In some embodiments, based on the received user inputs, the gaming engine can identify a response of the virtual conveyance to the user inputs and/or the direct or indirect effects of the user inputs on the virtual conveyance. In some embodiments, and by way of example, a direct effect includes when a user input indicates a turn of the virtual conveyance, and an indirect effect includes when a user inputs causes the explosion of an object within the gaming/simulation portion of the ride experience, which explosion creates shock-waves buffeting the virtual conveyance. The gaming engine can further track the passenger's and/or simulation vehicle's 108 progression through the ride experience.

In some embodiments, the gaming engine can further generate video and/or image data not viewable from the simulation vehicle 108. This can include, for example, video data and/or image data of one or several events, movements, actions, characters, objects, or items occurring or existing in the virtual world. For example, in some embodiments, the video data and/or image data may depict the movement, actions, and/or interactions of the virtual passenger vehicle in and/or with the virtual world. As used herein in the "virtual passenger vehicle" is the representation of the passenger vehicle 108 in the virtual world. In some embodiments, the virtual passenger vehicle can be at least one of: an aircraft; a land transport vehicle; an animal; a fantasy creature; a watercraft; or a spacecraft.

In some embodiments, some or all of the one or several events, movements, actions, characters, objects, or items occurring or existing in the virtual world can be viewable from the perspective of the simulation vehicle 108, and in some embodiments, some or all of the one or several events, movements, actions, characters, objects, or items occurring or existing in the virtual world may be non-viewable from the perspective of the simulation vehicle 108. In some embodiments, the generated video data and/or generated image data may depict one or several events, movements, actions, characters, objects, or items occurring or existing in the virtual world, which one or several events, movements, actions, characters, objects, or items occurring or existing in the virtual world are viewable from the passenger vehicle 108, but generated video data and/or generated image data may depict these one or several events, movements, actions, characters, objects, or items occurring or existing in the virtual world from a perspective other than the perspective viewable from the passenger vehicle 108. In some embodiments, for example, the generated video data and/or image data may depict the one or several events, movements, actions, characters, objects, or items occurring or existing in the virtual world from a third person perspective. In some embodiments, this third person perspective can allow viewing of the virtual passenger vehicle.

In some embodiments, the gaming engine can generate information relating to one or several attributes of coming events and/or actions in the narrative. For example, in some embodiments, the gaming engine can generate information identifying, for example: the brightness of one or several events and/or actions in the narrative; portions of the passenger vehicle 108 illuminated by those one or several events and/or actions in the narrative; and/or the duration of the bright events and/or actions in the narrative. This information can be stored in the memory 104, and specifically in the narrative/imagery database 106-A.

The gaming engine can output information to the image capture module 308 and/or to the virtual experience module 312. The image capture module 308 can control the capture of still or video image data. This can include the control of the one or several cameras 220 to captures this still or video image data. In some embodiments, the image capture module 308 can control the cameras 220 to capture video and/or still image data at times coinciding with one or several events and/or actions occurring in the narrative. In some embodiments, for example, the image capture module 308 can control the cameras 220 to capture still and/or video image data of one or several passengers and/or of one or several passenger locations. The still and/or video image data can be captured, in some embodiments, during events and/or actions in the narrative providing a desired level of illumination in all or portions of the passenger vehicle 108 and/or at some or all of the passenger locations 110. In some embodiments, the image capture module 308 can receive information from the gaming engine 304 relating to coming events and/or actions. Based on this information, the image capture module 308 can identify none, some, or all of the coming actions and/or events as meeting and/or exceeding illumination criteria such that still and/or video image data can be gathered during these coming events or actions. Based on communications received from the gaming engine 304, the image capture module 308 can trigger capture of still and/or video image data during the events and/or actions in the narrative meeting and/or exceeding illumination criteria.

The image capture module 308 can output image data to the image data evaluation engine 310. The image data evaluation engine 310 can receive image data from the image capture module 308 and can evaluate the image data. In some embodiments, this evaluation can be an automated evaluation of the image quality and can include, for example, determination of visibility of one or several desired passengers and/or features, image sharpness, image lighting, or the like. In some embodiments, the image data evaluation engine 310 can determine the visibility of one or several passengers faces in the image data, aspects of the facial expressions of the one or several passengers, or the like. In some embodiments, for example, an image is acceptable when a desired one or several passengers faces are visible and/or when one or several desired facial expressions are identified on the visible faces of those desired one or several passengers. In some embodiments, the image data evaluation engine 310 can apply one or several filters to the image data to improve the quality of the image. This can include, for example, changing brightness, contrast, shadows, sharpness, or the like. In some embodiments, image quality can be evaluated before and/or after application of one or several filters to the image data.

The image data evaluation engine 310 can output image data, and specifically can output image data having a desired quality level to the virtual experience module 312. The virtual experience module can combine the received image data with generated image and/or video data received from the gaming engine to generate video and/or image data combining video and/or still image data captured with video and/or still image data generated by the gaming engine. In some embodiments, the virtual experience module 312 can output data to the image capture module 308, which data can identify further desired image data such as, for example, still and/or video image data of one or several passengers.

Figure 4:
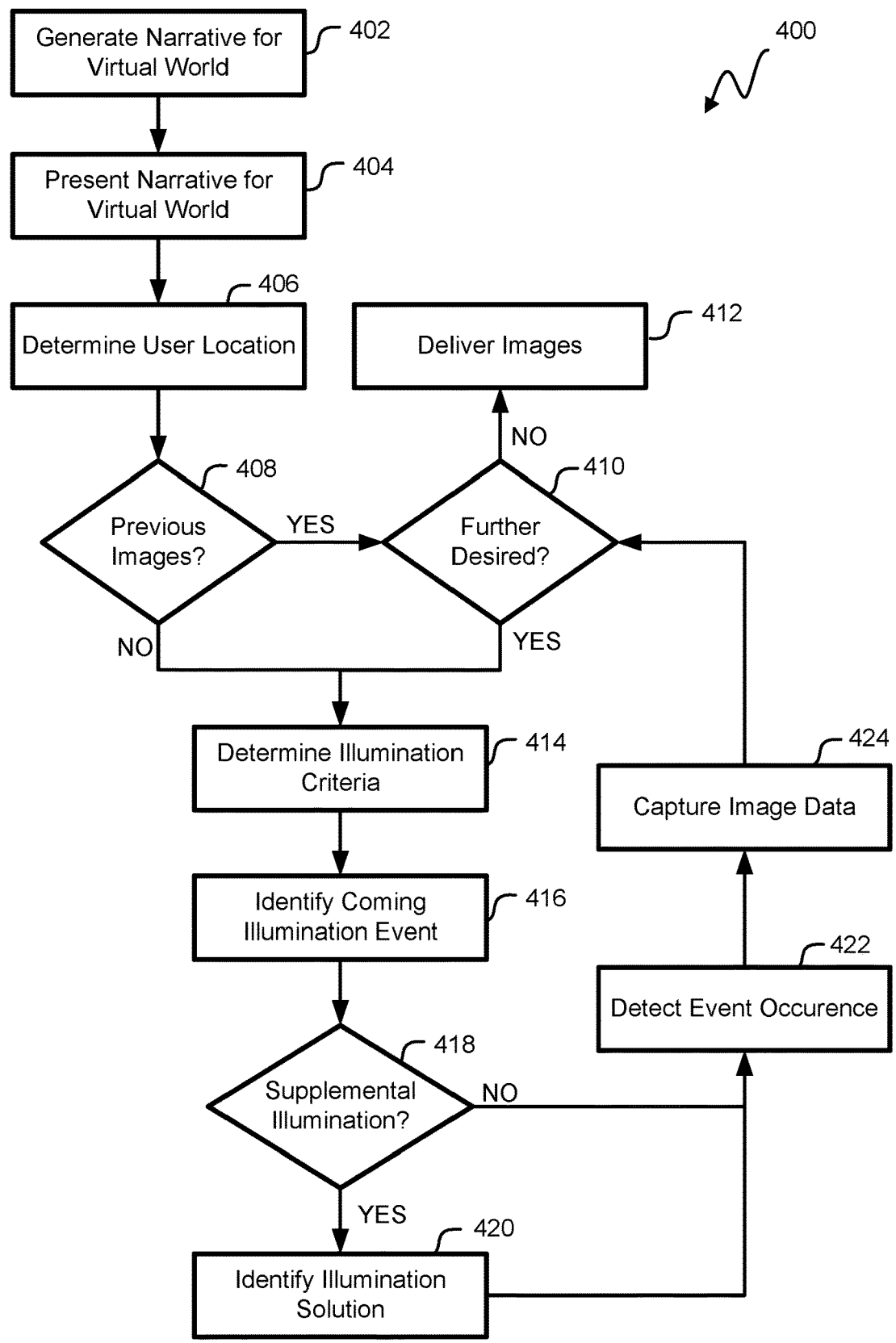
FIG. 4 is a flowchart illustrating one embodiment of a process for image data generation.

With reference now to FIG. 4, a flowchart illustrating one embodiment of a process 400 for image data generation is shown. The process can be performed by all or portions of the system 100 and/or by some or all of the modules 300. The process 400 begins at block 402, wherein a narrative for a virtual world is generated. In some embodiments, this can include the loading of one or several passengers into a passenger vehicle 108 and the starting of delivery of a ride experience to the passengers of the passenger vehicle 108. In connection with this delivery of the ride experience, the gaming engine 302 can generate the narrative including image data for presentation viewable from the passenger vehicle 108. At block 404, the narrative can be presented and/or can begin being presented. In some embodiments, the presentation of the narrative can include the displaying of video and/or images to passengers of the passenger vehicle 108, the generation of one or several sounds, and/or the controlling of the motion base 110 to generate one or several desired motions of the passenger vehicle 108. In some embodiments, the presentation of the narrative can include the receipt of one or several user inputs and affecting the narrative based on those received one or several user inputs.

At block 406 the location of one or several passengers within the passenger vehicle 108 is determined. In some embodiments, this can include determining which of several passenger locations 111 are occupied. In some embodiments, this determination can be made via generation and evaluation of image data captured from the passenger vehicle and/or via one or several sensors associated with some or all of the passenger locations 111, via one or several sensors such as pressure sensors associated with some or all of the passenger locations 111, and/or via passenger interactions with features of the passenger vehicle 108 such as one or several controls or safety restraints at some or all of the passenger locations 111 in the passenger vehicle 108. In some embodiments, each occupied passenger location 111 can be identified.

At decision step 408, it is determined whether previous image data, including still or video image data, has been captured. In some embodiments, this can include determining whether any previous image data of the current set of passengers in the passenger vehicle 108 has been captured for the current ride experience and/or whether any previous image data of each of the current set of passengers in the passenger vehicle 108 has been captured for the current ride experience. In some embodiments, this determination can be performed by querying the image database 106-C. In some embodiments, for example, image data can be stored in the image database 106-C. Image data can be associated with a ride experience, a passenger vehicle 108, and/or a passenger location 111. Based on the query result, the capture of previous image data can be determined.

If it is determined that image data has been previously captured, then the process 400 proceeds to decision step 410, wherein it is determined if further image data is desired. This determination can be made, in some embodiments, by the image data evaluation engine 310. In some embodiments, this can include determining whether further image data of some or all of the passengers is desired. This determination can be made based on the number of previously captured still images or video segments in the image data, and/or the quality of the still images and/or video segments in the previously captured image data. In some embodiments, for example, one or several previously captured still images or video segments may be of inadequate quality and/or may be unacceptable, and thus further images may be desired. In some embodiments, determining acceptability of one or several images can include determining visibility of faces of one or several passengers in the image, and in some embodiments, determining acceptability of the one or several images can further include identifying one or several desired expressions on the visible faces of the one or several passengers in the images. In some embodiments, the number of previously captured still images or video segments may be insufficient, and thus further image data may be desired.

In some embodiments, it may be determined that no further images are desired for one passenger and/or for one set of passengers, whereas further images are desired for another passenger and/or for another set of passengers. In such an embodiment, a first value may be associated with the one or several passengers for whom no further images are needed, and a second value may be associated with the one or several passengers for whom further images are needed.

If it is determined, that no further image data is desired, then the process 400 proceeds to block 412, wherein the image data is delivered. In some embodiments, this can include the delivery of the image data to the memory for storage in the image database 106-C, and in some embodiments, this can include delivery of image data including one or several still images and/or one or several video segments to one or several passengers of the passenger vehicle.

Returning again to decision step 410, if it is determined that further image data is desired, or returning again to decision step 408, if it is determined that there are not previous images, then the process 400 proceeds to block 414, wherein illumination criteria are determined and/or identified. In some embodiments, this can include identifying, for example, the number, type, and/or object of desired new captured image data. In some embodiments, for example, the illumination criteria can be determined, in part, by based on attributes of the desired image data including, for example, the type of desired image data (e.g. still or video), and/or the object of the desired image data (e.g. the passenger location 111 for which image data is desired). In some embodiments, these criteria can be predetermined for types of image data and/or for objects of the desired captured image data, and these criteria can be identified by querying of the memory 106 based on the attributes of the desired image data.

At block 416, one or several coming illumination events are identified. This coming illumination event can be, for example, an explosion, a view of a bright object, a lightning strike, or any event that would illuminate all or portions of the passenger vehicle 108. In some embodiments, these one or several coming illumination events can be identified by the gaming engine 304, and in some embodiments, these on or several coming illumination events can be identified by the image capture module 308 based on information received from the gaming engine. In some embodiments, for example, the gaming engine 304 can provide the image capture module information relating to one or several coming events. This information can identify an event as an illumination event for all or portions of the passenger vehicle 108 and/or characterize the illumination provided by the event, which characterization can be used by the image capture module 308 to determine if the coming event is an illumination event. Based on this information, the image capture module 308 can identify one or several of these coming events as illumination events. As used herein, a coming event is an illumination event when the coming event provides suitable lighting for image data capture and/or a suitable environment for use of supplemental illumination in connection with image data capture. In some embodiments, the coming event illuminates one or several passenger locations 111 identified in block 406, and in some embodiments, the coming event illuminates a location of a first passenger.

After one or several coming illumination events are identified, the process 400 proceeds to decision step 418, wherein it is determined if supplemental illumination is desired. In some embodiments, supplemental illumination may desired as part of the narrative and/or for one or several narrative-driven reasons. In some embodiments, supplemental illumination may be desired to increase illumination to facilitate image data and/or video data capture. In some embodiments, supplemental illumination may be desired both for narrative reasons and to facilitate image data and/or video data capture. In some embodiments, this can include determining whether the illumination of the illumination event is sufficient to eliminate the need for supplemental illumination, or alternatively, this can include determining that the illumination of the coming event is inadequate to illumination the one or several passenger locations 11, or specifically to sufficiently illumination the location of the first passenger. In some embodiments, this determination can be made by the image capture module.

If it is determined that supplemental illumination is desired, then the process 400 proceeds to block 420, wherein a supplemental illumination solution is identified. In some embodiments, this can include determining of the quantity, duration, and/or location of supplemental illumination desired. This determination can be made by the image capture module. After the illumination solution has been identified, or, returning again to decision step 418, if it is determined that no supplemental illumination is desired, then the process 400 proceeds to block 422, wherein the occurrence of the illumination event is detected and/or determined, and then proceeds to block 424, wherein image data is captured. In some embodiments, this image data can be captured during and/or partially during the illumination event. The image data can be captured by the image capture module 308, and specifically can be captured by cameras 220. In some embodiments, this image data can be captured in connection with use of one or several supplemental illumination features 222 to generate supplemental illumination, which supplemental illumination can compensate for the inadequacy of the illuminating of the one or several passenger locations, or more specifically of the first passenger. In some embodiments, this supplemental illumination can be generated in the form of a flash, flood lighting, or any other desired lighting technique.

After the image data has been captured, the process 400 returns to decision step 410, and continues as outlined above. Thus, in some embodiments, the process 400 can be performed with an identified first event, and then the process 400 can be iterative performed with subsequent events, such as a second coming event, until a desired number of images and/or a desired number of acceptable images have been identified for some or all of the passengers of the passenger vehicle 108. Thus, in some embodiments, a second event may illuminate all or portions of the passenger vehicle 108, and second image data can be captured during the occurrence of this second event. This second event can be identified, in some embodiments, when the first image data generated from the first event is unacceptable, and/or when further images are still desired. In some embodiments, this second image data can be generated using the same passenger as the first image data, and in some embodiments, this second image data can be generated using a second passenger at a second passenger location in the passenger vehicle 108. In such an embodiment, this second event may illuminate the second passenger location, and in some embodiments, this illumination of the second location may be inadequate, and thus may be supplemented with supplemental illumination.

Figure 5:
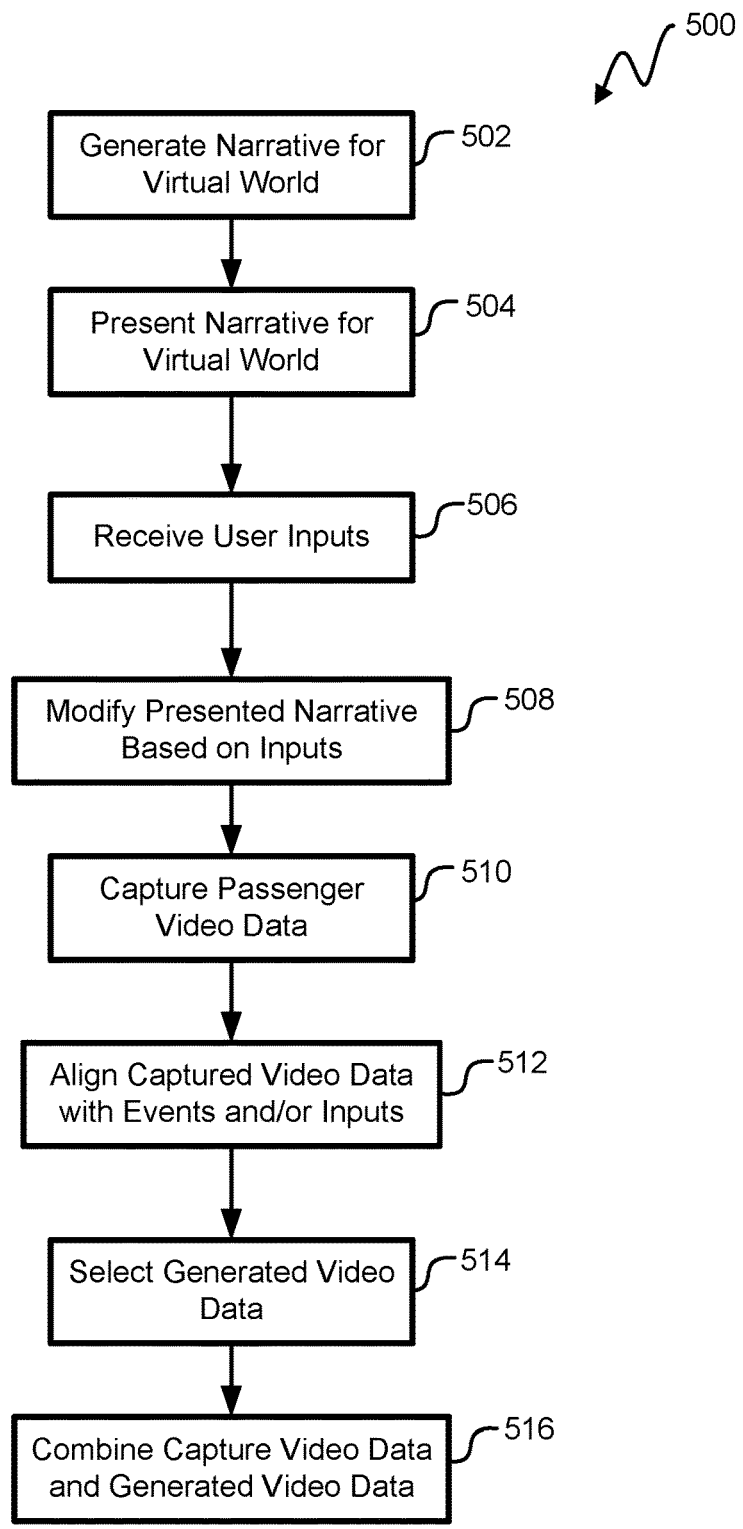
FIG. 5 is a flowchart illustrating one embodiment of a process for virtual experience image data generation.

With reference now to FIG. 5, a flowchart illustrating one embodiment of a process 500 for virtual experience image data generation is shown. The process 500 can be performed by all or portions of the system 100 and/or some or all of the modules 300. The process 500 can be performed to generate a video representative of a passenger's ride experience. This video is a virtual experience video as it includes video from and of the passenger's ride experience, and video generated reflecting aspects relating to the passenger's ride experience, but that were not part of the ride experience. For example, the video generated by process 500 may include video of the passenger captured during the ride experience, video from the perspective of the passenger of events and/or actions during the ride experience, and video not included in the ride experience but reflecting aspects of the ride experience. This video not included in the ride experience but reflecting aspects of the ride experience can include video showing event or actions from the ride experience, but from a perspective, such as a third-person perspective, other than that of the passengers of the passenger vehicle 108.

The process 500 begins at block 502, wherein the narrative is generated and then proceeds to block 504, wherein the narrative is presented to passengers of the simulation vehicle 108. At block 506, user inputs are received. In some embodiments, these user inputs can affect the narrative, and specifically can cause one or several actions and/or events within the narrative. These inputs can, in some embodiments, control the virtual passenger vehicle within the virtual world. These inputs can be received by the controls 109 of the simulation vehicle 108.

After the user inputs have been received, the process 500 proceeds to block 508, wherein the narrative is modified based on the received user inputs and wherein the modified narrative is presented to the user. In some embodiments, the presentation of the modified narrative can include the generation of image data associated with the modified narrative and the providing of this generated image data to the passengers of the passenger vehicle 108. This image data presented to the passengers of the passenger vehicle 108 can be viewable from the passenger vehicle 108.

At block 510, passenger video data is captured. In some embodiments, the video image data can be captured during all or portions of the ride experience, and can be captured for some or all of the passenger vehicle 108 and/or passenger positions 111. In some embodiments, the video data can be captured for one or several targeted events during the ride experience. These one or several events may be targeted due to illumination generated by the events, and in some embodiments, these events may be targeted due to one or several expected passenger reactions and/or actions associated with these events. In some embodiments, for example, an event may be targeted as the event is associated with a high-level of passenger engagement or a high-level of passenger action. For example, an event may be targeted when it is expected to cause a strong reaction, such as surprised reactions, in one or several passengers. Similarly, an event may be targeted with respect to one or several passengers when the event will lead to actions by those one or several passengers in response to the event. These target events can be identified in the memory 104, and specifically in the narrative/imagery database 106-A. In some embodiments, this captured video data can be enhanced, and/or post-processed. In some embodiments, this enhancing and/or post-processing can modify some aspect of the captured video data to enhance and/or further the story of the ride experience. This can include, for example, increasing an event captured in the video such as, increasing shaking or brightness of a flash of light. In some embodiments, this can include, for example, adding static or an interruption in the video data corresponding to an event such as a collision or the taking of damage. In some embodiments, the video image data can be captured by the cameras 220 under control of the image capture module 308.

At block 512, the captured video data is aligned with and/or associated with portions of the narrative and/or with received user inputs. In some embodiments, for example, the captured video data can be aligned with the ride experience such that each piece and/or segment of the video is linked with one or more events in the narrative and/or one or more received user inputs. In some embodiments, the step of block 512 can further include evaluation of the quality of the capture video image data and association of one or several values indicative of quality of segments of the video image data. This evaluation of the quality of the captured video image data can include identification of one or several portions of the captured video image data for inclusion in the virtual experience image data. The video can be aligned with the ride experience via the image data evaluation engine 310.

At block 514 generated video image data is selected. In some embodiments, the generated video image data can be pre-generated and in some embodiments, the generated video image data can be custom generated. In some embodiments, the generated video image data can include pre-rendered content that can be, in some embodiments, included in captured/composited media. This pre-rendered content can include, for example, one or several award, badges, scores, and/or indicia or success or failure. In some embodiments, this pre-rendered content can include stock footage, pre-produced media, static or motion graphics, titles, and/or credits. The generated video image data can, in some embodiments, be generated based on the virtual world associated with the narrative presented as part of the ride experience and/or reflects actions, characters, events, objects, or item in the virtual world. In some embodiments, the generated video image data is not viewable by the passengers of the passenger vehicle 108 during the ride experience. In some embodiments the video data selected can have a desired length, can include one or several desired events or actions, and/or can have one or several desired perspectives. The video can be selected by the virtual experience module 312 from the image database 106-C.

At block 516, the selected generated video data can be combined with all or portions of the video data captured in block 510. In some embodiments, for example, video data can be combined according to a recipe specifying how to combine the video data. In some embodiments, the video data can be combined to tell the story of the ride experience, thus generated video and captured video can be combined according to length and/or the sequencing of events of the ride experience. In some embodiments, for example, the generated video can show the events of the ride experience, and segments of captured video data can be inserted into the generated data at one or several locations to show passenger reactions to the events, and/or one or several passenger inputs causing one or several actions or events. In some embodiments, the generated video data and captured video data can be spliced together, and in some embodiments, the generated video data and captured video data can be combined and/or composited such as via an alpha mask. The combined video data—the virtual experience image data—can be stored in the image database 106-C.

Figure 6:
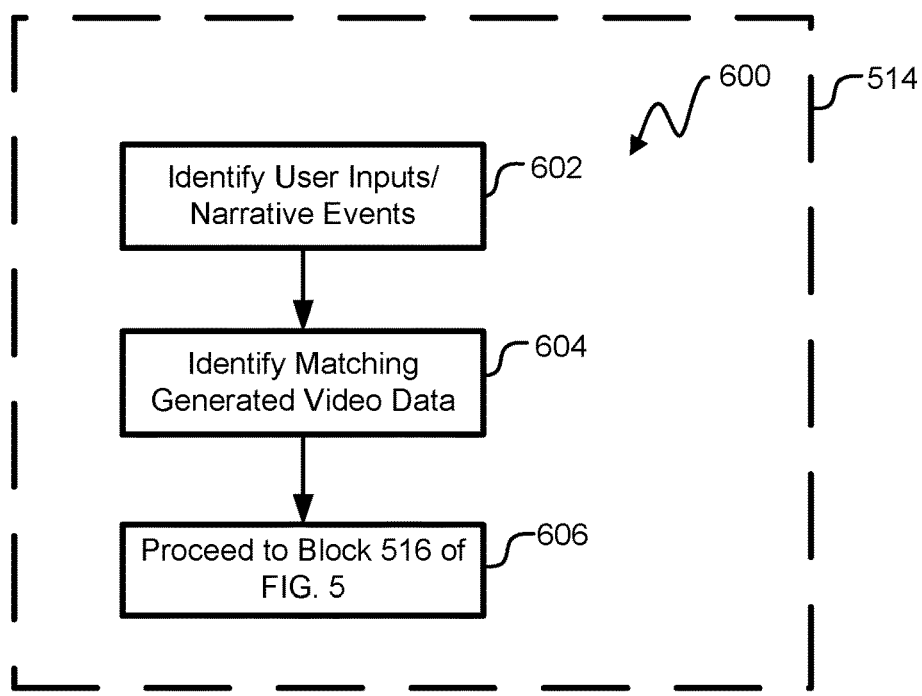
FIG. 6 is a flowchart illustrating one embodiment of a process for selecting generated video.

With reference now to FIG. 6, a flowchart illustrating one embodiment of a process 600 for selecting generated video is shown. In some embodiments, the process 600 can be performed as a part of, or in the place of step 514 of FIG. 5. The process 600 can match: one or several user inputs and/or events or actions in the ride experience resulting from these user inputs; a temporal status derived from another processing module applied to the collection of user input data such as a high scorer; and/or information known about a passenger, which information can be derived in any desired manner, with one or several generated video segments, which generated video segments can be pre-generated. Via the process 600, generated video used to create the virtual experience image data can be customized based on the user inputs.

The process 600 begins at block 602, wherein user inputs and/or narrative events resulting from user inputs in the ride experience are identified. After these user inputs and/or narrative events resulting from user inputs are identified, the process 600 proceeds to block 604, wherein generated video matching the narrative events and/or received user inputs are identified. In some embodiments, for example, an explosion may be identified as an event in block 602 and generated video data showing such an explosion may be identified in block 604. Similarly, a vehicle turning right may be identified in block 602 and generated video data showing a vehicle turning right may be identified in block 604. In some embodiments, for example, a finite number of events and/or user inputs can be received as part of the ride experience, and a segment of generated video data can be stored in the image database 106-C for each of these events or user inputs. In such an embodiment, once the input or event from the ride experience is identified, the matching segment of generated video data can be identified and retrieved from the image database 106-C. After identification of the matching generated video data, the process 600 proceeds to block 606 and continues to block 516 of FIG. 5.

Figure 7:
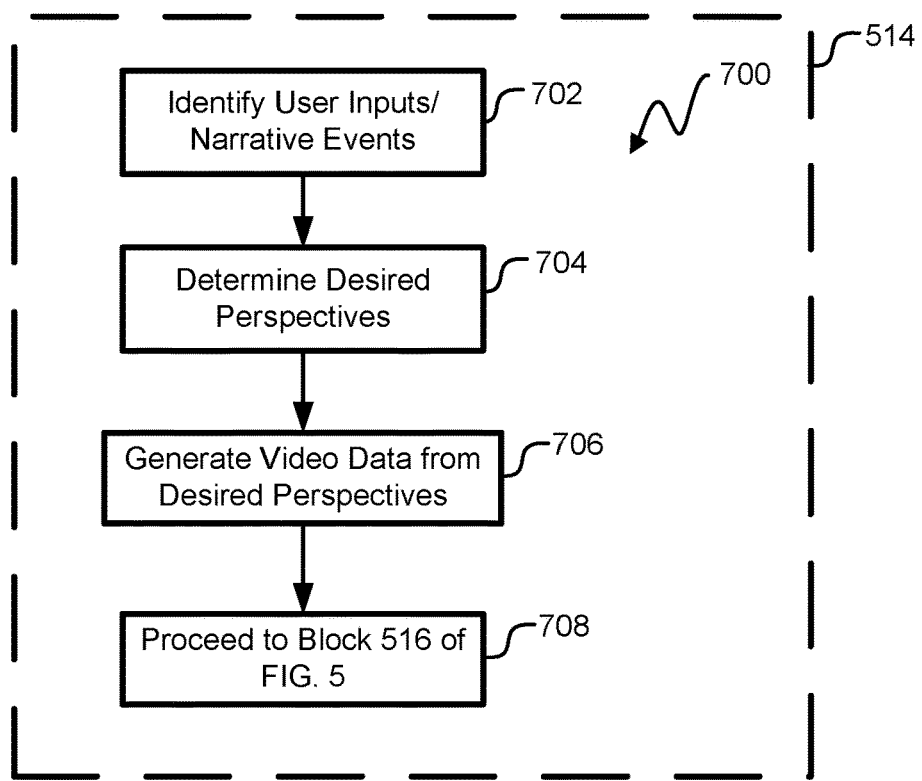
FIG. 7 is a flowchart illustrating another embodiment of a process for selecting generated video.

With reference now to FIG. 7, a flowchart illustrating another embodiment of a process 700 for selecting generated video is shown. In some embodiments, the process 700 can be performed as a part of, or in the place of step 514 of FIG. 5. The process 700 can custom generate video image data to match inputs and/or events or actions in the ride experience as those events occur and/or inputs are received, or subsequent to completion of the ride experience. This video image data can be generated by the gaming engine 304. Via the process 600, generated video used to create the virtual experience image data can be customized based on the user inputs and/or events from the ride experience.

At block 702, user inputs and/or narrative events resulting from user inputs in the ride experience are identified. After these user inputs and/or narrative events resulting from user inputs are identified, the process 700 proceeds to block 704, wherein one or several desired perspectives for generated video image data are identified. In some embodiments, for example, a desired perspective can be identified for each event and/or for each input, a desired perspective can be identified for one or several event types and/or input types, and in some embodiments, a desired perspective can be identified for all generated video.

At block 706 custom video image data is generated. In some embodiments, this video image data is generated for the one or several desired perspectives identified in block 706. In some embodiments this video image data can be generated by the gaming engine 304 from the virtual world. This video image data, in some embodiments, is distinct from the video presented as part of the narrative to the passengers of the passenger vehicle, and this video image data generated in block 706, in some embodiments, is not presented as part of the ride experience. In some embodiments, the video data generated in block 706 depicts actions of the virtual passenger vehicle in the virtual world. The video image data can be stored in the image database 106-C. After the video image data has been generated, the process 700 proceeds to block 708 and continues to block 516 of FIG. 5.

IV. Computer System

Figure 8:
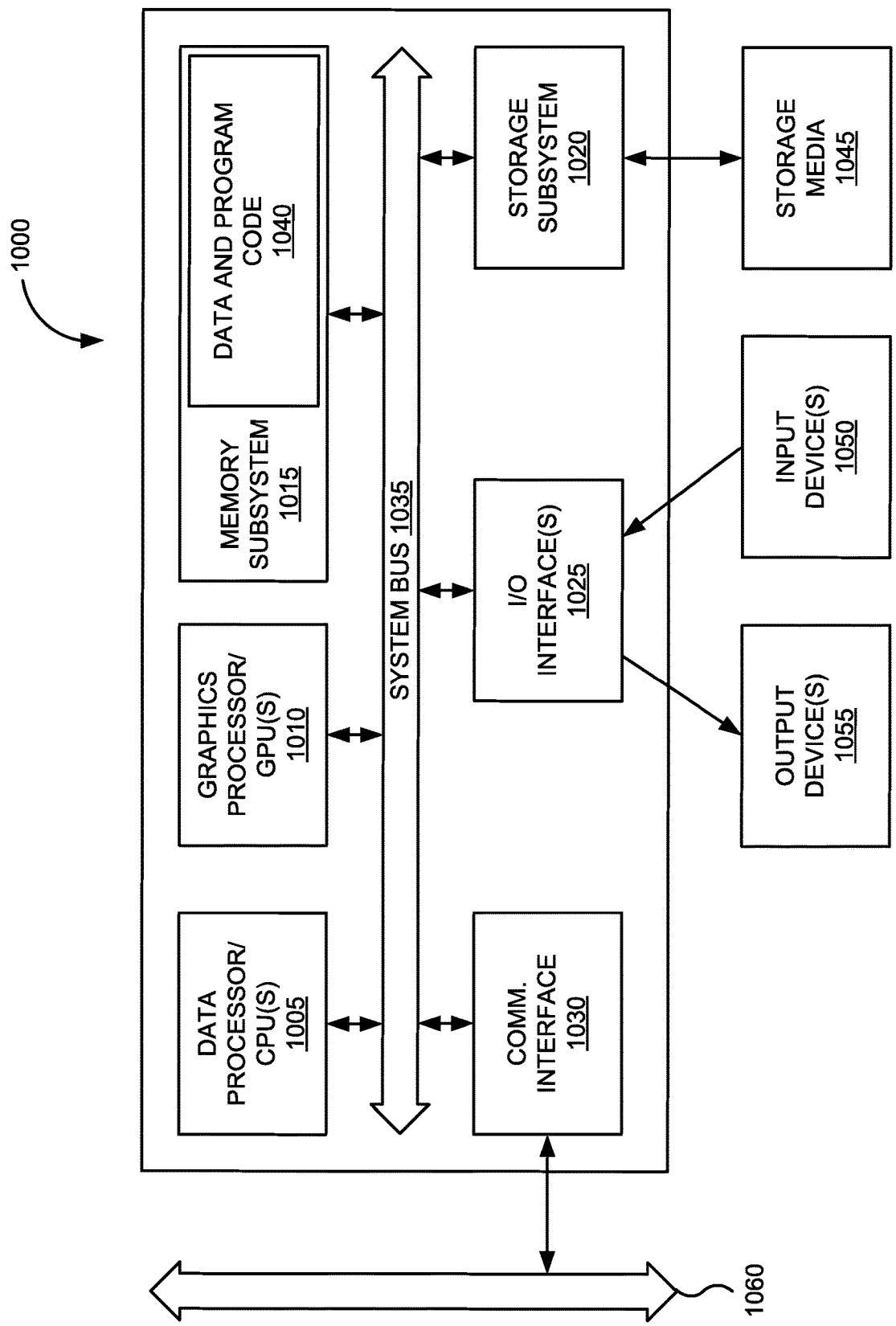
FIG. 8 is a block diagram of a computer system or information processing device that may incorporate an embodiment, be incorporated into an embodiment, or be used to practice any of the innovations, embodiments, and/or examples found within this disclosure.

FIG. 8 shows a block diagram of computer system 1000 that is an exemplary embodiment of the processor 102 and can be used to implement methods and processes disclosed herein. FIG. 8 is merely illustrative. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication.

The one or more data processors or central processing units (CPUs) 1005 execute program code to implement the processes described herein. The one or more graphics processor or graphical processing units (GPUs) 1010 execute logic or program code associated with graphics or for providing graphics-specific functionality. Memory subsystem 1015 can store information, e.g., using machine-readable articles, information storage devices, or computer-readable storage media. Storage subsystem 1020 can also store information using machine-readable articles, information storage devices, or computer-readable storage media. Storage subsystem 1020 may store information using storage media 1045 that can be any desired storage media.

The one or more input/output (I/O) interfaces 1025 can perform I/O operations and the one or more output devices 1055 can output information to one or more destinations for computer system 1000. One or more input devices 1050 and/or one or more output devices 1055 may be communicatively coupled to the one or more I/O interfaces 1025. The one or more input devices 1050 can receive information from one or more sources for computer system 1000. The one or more output devices 1055 may allow a user of computer system 1000 to view objects, icons, text, user interface widgets, or other user interface elements.

Communications interface 1030 can perform communications operations, including sending and receiving data. Communications interface 1030 may be coupled to communications network/external bus 1060, such as a computer network, a USB hub, or the like. A computer system can include a plurality of the same components or subsystems, e.g., connected together by communications interface 1030 or by an internal interface.

Computer system 1000 may also include one or more applications (e.g., software components or functions) to be executed by a processor to execute, perform, or otherwise implement techniques disclosed herein. These applications may be embodied as data and program code 1040. Such applications may also be encoded and transmitted using carrier signals adapted for transmission via wired, optical, and/or wireless networks conforming to a variety of protocols, including the Internet.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of automated image capture, the method comprising:
    generating imagery of a virtual world to a passenger vehicle during a ride experience with a gaming engine;
    determining a location of at least one passenger in the passenger vehicle during the ride experience;
    using the gaming engine, generating information identifying when a coming first event will occur in the virtual world during the ride experience, wherein the coming first event illuminates the location of the at least one passenger in the passenger vehicle;
    communicating the information generated by the gaming engine to an image capture device; and
    capturing with the image capture device a first image data during occurrence of the first event.

2. The method of claim 1, wherein the first event comprises a simulated lighting event.

3. The method of claim 1, further comprising: determining an inadequacy of the illuminating of the location of the at least one passenger in the passenger vehicle of the coming first event; and generating supplemental illumination during occurrence of the first event to compensate for the inadequacy of the illuminating of the location of the at least one passenger during occurrence of the first event.

4. The method of claim 3, wherein the supplemental illumination comprises a flash.

5. The method of claim 1, further comprising: determining acceptability of the first image data; and updating a value associated with the passenger based on the acceptability of the first image data.

6. The method of claim 5, wherein determining acceptability of the first image data comprises determining visibility of the face of the at least one passenger.

7. The method of claim 6, further comprising: identifying a coming second event in the virtual world, wherein the coming second event illuminates the location of the at least one passenger in the passenger vehicle; and capturing second image data during occurrence of the second event.

8. The method of claim 7, wherein the second event is identified when the first image data is unacceptable, and wherein the second image data is captured when the first image data is unacceptable.

9. The method of claim 1, further comprising: determining a location of a second passenger in the passenger vehicle; identifying a coming second event in the virtual world during the ride experience, wherein the coming second event illuminates the location of the second passenger in the passenger vehicle; and capturing second image data of the second passenger during occurrence of the second event.

10. The method of claim 9, wherein the illumination of the location of the second passenger during the first event inadequately illuminates the location of the second passenger in the passenger vehicle.

11. A system for automated image capture, the system comprising:
    a passenger vehicle comprising a plurality of passenger locations;
    a content presentation system configured to present images from a virtual world viewable in the passenger vehicle;
    at least one camera;
    a processor comprising a gaming engine and an image capture module, the processor configured to:
        generate imagery of a virtual world viewable from the passenger vehicle during a ride experience with the gaming engine;
        determine a location of at least one passenger in the passenger vehicle during the ride experience with the gaming engine;
        with the gaming engine, generate information identifying when a coming first event in the virtual world will occur during the ride experience, wherein the coming first event illuminates the location of the at least one passenger in the passenger vehicle;
        receive the information identifying when the coming first event in the virtual world will occur during the ride experience with the image capture module; and
        control the at least one camera to capture first image data during occurrence of the first event.

12. The system of claim 11, wherein the first event comprises a simulated lighting event.

13. The system of claim 11, wherein the processor is further configured to: determine an inadequacy of the illuminating of the location of the at least one passenger in the passenger vehicle of the coming first event; and generate supplemental illumination during occurrence of the first event to compensate for the inadequacy of the illuminating of the location of the at least one passenger during occurrence of the first event.

14. The system of claim 13, wherein the supplemental illumination comprises a flash.

15. The system of claim 11, wherein the processor is further configured to: determine acceptability of the first image data; and update a value associated with the passenger based on the acceptability of the first image data.

16. The system of claim 15, wherein determining acceptability of the first image data comprises determining visibility of the face of the at least one passenger.

17. The system of claim 16, wherein the processor is further configured to: identify a coming second event in the virtual world, wherein the coming second event illuminates the location of the at least one passenger in the passenger vehicle; and capture second image data during occurrence of the second event.

18. The system of claim 17, wherein the second event is identified when the first image data is unacceptable, and wherein the second image data is captured when the first image data is unacceptable.

19. The system of claim 11, wherein the processor is further configured to: determine a location of a second passenger in the passenger vehicle; identify a coming second event in the virtual world during the ride experience, wherein the coming second event illuminates the location of the second passenger in the passenger vehicle; and capture second image data of the second passenger during occurrence of the second event.

20. The system of claim 19, wherein the illumination of the location of the second passenger during the first event inadequately illuminates the location of the second passenger in the passenger vehicle.

\* \* \* \* \*